United States Patent

Gallagher et al.

[11] 3,852,214
[45] Dec. 3, 1974

[54] LIQUID POLYSULFIDE POLYMER GLASS-TO-METAL SEALANT COMPOSITION

[75] Inventors: John P. Gallagher, Milton Square, N.J.; Robert M. Meyers, Fairless Hills, Pa.; Earl H. Surg, Trenton, N.J.; Clark M. Willitts, Levittown, Pa.

[73] Assignee: Thiokol Corporation, Bristol, Pa.

[22] Filed: May 25, 1972

[21] Appl. No.: 256,737

Related U.S. Application Data

[62] Division of Ser. No. 76,300, Sept. 28, 1970, Pat. No. 3,697,472.

[52] U.S. Cl............... 252/403, 252/182, 252/404, 260/45.7 R, 260/45.95 E, 260/79.1
[51] Int. Cl............................................. B01j 1/18
[58] Field of Search............... 252/403, 182, 404; 260/37 R, 45.7 R, 79.1, 45.95 E, 33.8 R

[56] References Cited
UNITED STATES PATENTS

| | | | |
|---|---|---|---|
| 3,000,851 | 9/1961 | Schweitzer | 260/45.95 E |
| 3,029,214 | 4/1962 | Hobson | 260/45.95 E |
| 3,413,261 | 11/1968 | Schalin | 260/45.95 E |

OTHER PUBLICATIONS
Condensed Chemical Dictionary, Sixth Edition, 1961, p. 590.

*Primary Examiner*—Benjamin R. Padgett
*Assistant Examiner*—Irwin Gluck
*Attorney, Agent, or Firm*—Thomas W. Brennan

[57] ABSTRACT

A liquid polysulfide polymer sealant composition for sealing glass to metal having greatly improved adhesion stability when exposed to ultraviolet radiation or sunlight transmitted through glass and greatly improved penetrometer cure and adhesion rate properties is obtained by use of hydroquinone and quinone ultraviolet radiation adhesion stabilizers and quaternary ammonium chloride curing and adhesion rate regulators.

Quinone and compounds having the structure

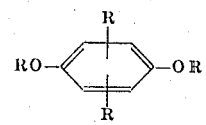

where R represents H or alkyl groups having 1–6 carbon atoms, e.g., hydroquinone and p-methoxy phenol, are effective additives for preventing loss of cohesive strength or loss of adhesion of cured polysulfide polymer compositions to glass where the sealant/glass interface is exposed to ultraviolet radiation, including sunlight. However, the addition of these adhesion stabilizers have an adverse effect on quick adhesion and curing rate of the sealant. Therefore, the addition of curing and adhesion rate regulators is required.

Improved quick adhesion and cure rate properties are obtained by the use of quaternary ammonium chlorides represented by the formula

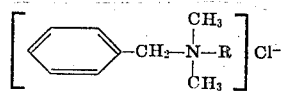

where R represents an alkyl having 8 to 24 carbon atoms.

5 Claims, No Drawings

LIQUID POLYSULFIDE POLYMER GLASS-TO-METAL SEALANT COMPOSITION

This is a divisional, of application Ser. No. 76,300 filed Sept. 28, 1970, now U.S. Pat. No. 3697472.

BACKGROUND OF THE INVENTION

1. Field of the Invention

The invention relates to a fast adhesion and fast curing water activated liquid polysulfide sealant composition with improved adhesion in the cured state to glass substrates which are exposed to ultraviolet radiation through the glass. This composition comprises a —SH terminated organic polymer, adhesion stabilizers such as quinone or hydroquinone and quaternary ammonium chloride curing and adhesion rate regulators.

2. Description of the Prior Art

Many —SH terminated organic polymers are known in the art. Of particular interest to the practice of the present invention are liquid polythiol polymers having various backbones, such as hydrocarbon, alkylene polysulfide, polyether, and polyurethane. —SH terminated liquid polysulfide polymers are of most interest herein.

—SH terminated polysulfide polymers are characterized by the fact that they have recurring polysulfide linkages between organic radicals having at least two primary carbon atoms for connection to disulfide linkages. Thus, for example, disulfide polymers have a general structure corresponding to the formula

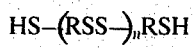

in which the R's are organic polyvalent radicals, preferably predominantly divalent alkylene oxahydrocarbon or thiahydrocarbon radicals such as diethyl formal radicals, and n is a number greater than one, which may vary from a relatively small number in the case of liquid polymers having a molecular weight of about 500 to 25,000, e.g., about 3 to 100 where R is (—S—$C_2H_4OCH_2OC_2H_4$—S—), to a relatively large number in the case of solid polymers which may have a molecular weight of about 100,000 to several million. The low molecular weight polysulfide polymers, e.g., 500 to 25,000, are normally liquids at 25°C. and are preferably formed by reaction of an organic dihalide with a backbone corresponding to R with an inorganic polysulfide, such as $Na_2S_x$, x usually being greater than two. Solid organic polysulfide polymers are produced thereby which may then be split according to the method of Patrick and Ferguson in U.S. Pat. No. 2,466,963 to provide liquid polythiol polymers. The present invention concerns the use of adhesion stabilizers such as quinone and hydroquinone; and curing and adhesion rate regulators such as quaternary ammonium chloride in water activated polysulfide sealant compositions resulting in unexpected improved adhesion stability of the cured polymer to glass and other substrates when exposed to ultraviolet radiation through the substrate while improving quick adhesion and fast curing rates.

Various adhesion additives and primers have been used to improve the adhesion of the polysulfide compositions to the various substrates then necessary. Suitable adhesion additives include, for example, phenolic resins; polyvinyl acetate; alkoxy silanes of various types including mercapto and amino derivatives thereof, such as described in U.S. Pat. Nos. 3,297,473 and 3,312,669; and alkoxy silane terminated polysulfide polymers, which are particularly useful as adhesion additives for the high rank polysulfide polymers as described in U.S. Pat. No. 3,476,826. Various commercially available primers have also been used with polysulfide polymers, silicones, vinyl resins, furane resins and others. Commercially, adhesion additives are usually preferred to primers because of the simplicity of application.

Although the above-mentioned adhesion additives and primers are useful for certain applications, they are not always capable of maintaining the adhesion of cured polysulfide polymer compositions to glass which is exposed to ultraviolet radiation or sunlight with the glass facing the light source. Using black formulations cured with calcium peroxide, for example, there is almost complete adhesive failure at the sealant/glass interface within 1 or 2 days. Compositions containing other curing agents vary in their susceptiblity to ultraviolet light, but all show a similar tendency in different degrees. There is no loss of adhesion of polysulfide sealants properly bonded to glass when sunlight strikes the sealant surface rather than being transmitted to the sealant/glass interface through the glass.

The problem of light striking the glass/sealant interface arises, for example, in the case of automobile windshields and thermopane windows exposed to sunlight or in the case of glass enclosed structures exposed to ultraviolet light, as might occur in research or hospital laboratories. Thus, ordinarily, polysulfide sealant formulations, particularly black or colored formulations, would not be suitable for such uses involving prolonged exposure to light.

No prior art is known to the applicant which incorporates the quaternary ammonium chlorides into water activated polysulfide sealant compositions. The use of cationic alkyl substituted quaternary ammonium salts is described in Rike, U.S. Pat. No. 2,776,010 issued Jan. 1, 1957. However, these quaternary ammonium salts are used as emulsifying agents in oil emulsion cements comprising Portland cement, liquid hydrocarbon oil and water to form a pumpable slurry for sealing porous earth in oil wells. Therefore, the latter system would be completely unsuitable for attaining the objectives of the present invention.

SUMMARY OF THE INVENTION

Thus it is an object of the invention to provide liquid polysulfide polymer compositions, particularly water-activated calcium peroxide-containing liquid polysulfide compositions, which have improved adhesion, in the cured state, to glass substrates which are exposed to ultraviolet radiation or sunlight transmitted through the glass. This object is accomplished by incorporating in the liquid polysulfide polymers composition, prior to cure, as an adhesion stabilizer an adhesion stabilizing amount of (1) a compound having the structure

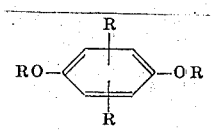

where the R's may be H or a lower alkyl group having 1–6 carbon atoms, or (2) quinone. The amount of adhesion stabilizer may range from 0.10 part to 5 parts per 100 parts by weight of the liquid polysulfide polymer.

The adhesion stabilizer may be incorporated at the other ingredients in the sealant formulation or it may be added alone to the liquid polymer beforehand, since this has no deleterious effect on the polymer during storage and does not affect the ultimate stabilizing effect in the cured composition.

Another object of the invention is directed to improving quick adhesion, curing rate and the range of water concentration for cure activation in the water-activated liquid polysulfide compositions especially since the ultraviolet radiation adhesion stabilizers incorporated in this invention tend to retard quick adhesion and curing rates. This object is accomplished by incorporating in the liquid polysulfide polymer composition, prior to cure, as a curing and adhesion rate regulator, a regulating amount of a quaternary ammonium chloride represented by the structure

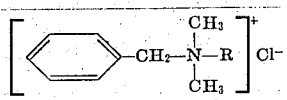

where R may be an alkyl containing from 8 to 24 carbon atoms.

DESCRIPTION OF THE PREFERRED EMBODIMENTS

The polymers useful in the practice of the present invention are liquid polysulfide polymers such as described in U.S. Pat. No. 2,466,963. These have the general formula HS(—RSS—)$_n$RSH where R is a divalent aliphatic organic radical, which may contain O or S in the carbon chain and n has a value such that the molecular weight is between 500 and 25,000. They are viscous liquids having viscosities within the range of 300 to 150,000 poises at 25°C. The commercially important liquid polymers of this type are particularly described in articles by Fettes and Jorczak, published in "Industrial and Engineering Chemistry," Vol. 42, Page 2,217 (1950), and Vol. 43, Page 324 (1951). They are generally prepared from bis-beta-chloroethyl formal and are essentially composed of recurring (—SCH$_2$—CH$_2$—OCH$_2$—OCH$_2$—CH$_2$S—) groups and have free mercapto terminals through which they may be cured to form a solid elastomer. In the manufacture of these commercial polymers, a small percentage of trichloropropane is commonly mixed with the bis-beta-chloroethyl formal to provide a slightly cross-linked structure upon cure. Particularly, commercially valuable polymers include those having preferably recurring groups, such as bis(ethyleneoxy) methane, bis(-butyleneoxy)methane, bis(ethylene)oxy, and bis(-butylene)oxy and an average molecular weight of approximately 1,000 to 10,000 and preferably 3,500 to 8,000.

The liquid polysulfide polythiol polymers may be cured to solid elastomers with a large variety of organic and inorganic oxidative curing agents, such as described in an article by Interscience Publishers, dated 1962, entitled "Polyethers Part III Polyalkylene Sulfides and other Polythioethers" published in Volume XIII of the High Polymer Series on pages 164–172. Certain curing agents are particularly useful in commercial sealant formulations as dormant curing agents which are activated by water at the time the cure is desired. Such curing agents include, for example, calcium peroxide, barium peroxide, lithium peroxide, lead dioxide, manganese dioxide and calcium orthoplumbate. Although lead peroxide cures are accelerated by water, lead peroxide is so active even in extremely dry compositions that it cannot be considered a dormant curing agent suitable for use in one-package systems. Lead peroxide and calcium orthoplumbate cured polysulfide compositions show an increase in cohesive strength by inclusion of the stabilizers of the present invention although they have better resistance to loss of adhesion than those containing some of the other curing agents listed above, particularly calcium peroxide.

The ultraviolet radiation adhesion stabilizers and the curing and adhesion rate regulators described herein are effective with liquid polysulfide polymer sealant compositions containing the usual additives used in commercial applications such as fillers, pigments, plasticizers, surfactants, accelerators, retarders, adhesion additives, etc. The use of the conventional primers normally used with any particular formulation is also recommended.

The adhesion stabilizers may be represented by quinone and a composition having the formula

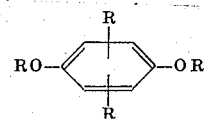

where R represents H or an alkyl containing from 1 to 6 carbon atoms. For example, R may be hydrogen, methyl, ethyl, propyl, butyl, penta, and hexa. The preferred adhesion stabilizers are hydroquinone, p-quinone, p-methoxyphenol, and p-dimethoxybenzene.

The adhesion stabilizers contained in the sealant composition may be present in amounts from about 0.1 to 5 parts by weight per 100 parts by weight of the liquid polysulfide polymer, preferably 0.1 to 2 parts by weight.

The quaternary ammonium chloride curing and adhesion rate regulators may be represented by the formula

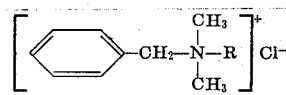

where R represents an alkyl containing from 8 to 24 carbon atoms. For example, R may be octyl, nonyl, decyl, dodecyl, tridecyl, myristyl (tetradecyl), hexadecyl, octadecyl, and tetracosyl, preferably R is myristyl.

The preferred quaternary ammonium chlorides are myristyl dimethyl benzyl ammonium chloride and 1, 4, 7, 10-tetraoxa-dodecan-12-ol ethyl octyl ammonium chloride.

The cationic quaternary ammonium chloride sold under the trademark Katapone VV328 with a molecular weight of 476.5, specific gravity of 0.99 and with 64.79 percent carbon, 10.75 percent hydrogen, 13.70 percent oxygen, 3.31 percent nitrogen and 7.45 percent chlorine is also preferred.

The quaternary ammonium chloride curing and adhesion rate regulators contained in the sealant composition may be present in amounts from about 0.1 to 1 parts by weight per 100 parts by weight of the liquid polythiol polymer, preferably 0.2 to 0.3 parts by weight.

The composition also includes (1) alkaline earth metal oxide compounds, particularly, calcium oxide, barium oxide, and magnesium oxide (2) plasticizers, such as, chlorinated hydrocarbons, (3) fillers, (4) curing accelerators, such as, tertiary amines, more particularly trimethylamine, triethylamine, N(tripropylamine) and tri-n-butylamine, (5) moisture activated curing agents and (6) other ingredients usually included in sealant formulations.

In the sealant composition, all the ingredients are simply stirred or mixed together in the absence of water to homogenize the composition. The composition can be stored or shipped in this form in sealed packages.

To form the curable sealant composition, the sealant ingredients are simply mixed with from 1 to 2.5 percent water by weight based on the total weight of the composition, or more preferable 1.5 to 2 percent water by weight. The composition is ready to apply to a substrate, such as, glass, metal, plastics and, more particularly automobile windshields. Setting begins within a few minutes in the presence of water and curing is substantially completed in less than 4 hours in most cases.

In order to point out more fully the invention in its practical aspects, the following illustrative examples are given of the practice of the invention for preparing the sub-combinations and combinations of the ingredients used in their various phases.

The invention is illustrated by means of a representative, commercially available —SH terminated LP–32 liquid polysulfide polymer. The LP–32 polymer has the formula $$HS-(C_2H_4OCH_2OC_2H_4-SS)_{23}C_2H_4O-CH_2-OC_2H_4-SH,$$

a molecular weight of 4,000, and 0.5 of branching in the side chains. A commercially available LP–2 liquid polysulfide polymer has a similar formula and molecular weight as the LP–32 liquid polysulfide polymer but differs in having 2 percent branching in the side chains. However, LP–32 polymer yields cured elastomers having softer body and greater elongation than does LP–2 polymer which could also be used in this composition.

While the invention is illustrated with the LP–32 liquid polysulfide polymer, it is to be understood that the invention may be practiced with other polythiol reactants.

EXAMPLES 1–19

In examples 1–19, the ingredients of the formulations except the water, were hand mixed together in a suitable container and dispersed on a 3 roll paint mill. The water was then mixed with an electrically driven mixing blade for 3 to 5 minutes. The sealant was used to bond together strips of primed enameled autobody metal and glass surfaces previously primed with a silane primer. After an overnight cure at room temperature, the glass/sealant interfaces were exposed to ultraviolet radiation from various sources transmitted through the glass. The shear adhesion of the sealant to the glass was tested by applying sufficient material to 0.25 × 1 × 4 inch glass plates precoated with primer to provide a bond area of 1 sq. inch by 1/8 inch thickness when mated with a 0.090 × 1 × 3 inch enameled steel panel precoated with primer. The panels were pulled apart by a standard testing machine having a jaw separation rate of 1 inch per minute.

The primer used on the glass was a commercially available aminoalkyl silicone primer. However, a chlorinated rubber urethane primer containing approximately 5 percent to 10 percent solids was used also as a top coat for the aminoalkyl silicone primer.

The basic formulation used to test the adhesion stabilizers contained one hundred parts of a liquid polysulfide polymer $HS(C_2H_4OCH_2OC_2H_4SS)_{23}C_2H_4OCH_2OC_2H_4SH$ having 0.5 percent cross-linking, and the following ingredients in parts by weight:

| | |
|---|---|
| Chlorinated Biphenyl Plasticizer 54% Cl (Aroclor 1254) | 40 |
| CaO | 5 |
| CaO$_2$ (60%) | 8 |
| Triethylamine | 0.5 |
| Sterling MT carbon black | 50 |
| Sterling R carbon black | 20 |
| Toluene | 3.5 |
| Water | 3 |

The identity of the stabilizers tested in the examples is as follows:

| Stabilizer | Chemical name | Structure |
|---|---|---|
| A | p-Methoxyphenol | HO—⌬—OCH$_3$ |
| B | p-Dimethoxybenzene | CH$_3$O—⌬—OCH$_3$ |
| C | Hydroquinone | HO—⌬—OH |
| D | p-Quinone | O=⌬=O |

| Ex. | Stabilizer | pbw | Season | Shear Adhesion psi After Outside Exposure | | |
|---|---|---|---|---|---|---|
| | | | | 7 Days | 14 Days | 30 Days |
| 1 | none | control | W | 100 3%CF | 43 AF | 50 AF |
| 2 | A | 0.5 | W | 68 MPF | 158 MPF | 73 MPF |
| 3 | B | 0.5 | W | 88 MPF | 131 MPF | 73 MPF |
| 4 | C | 0.5 | W | 238 CF | 176 CF | 270 CF |
| 5 | C | 0.5 | S | 183 CF | 215 CF | 214 CF |
| 6 | C | 1.0 | S | 206 CF | 222 CF | 220 CF |
| 7 | C | 2.0 | S | 176 CF | 210 CF | 220 CF |
| 8 | C | 0.25 | S | 215 CF | 240 CF | 245 CF |
| 9 | D | 0.5 | W | 264 CF | 116 SCF, PF | 233 CF |

Legend: W - winter
S - summer
CF - cohesive failure
MPF - metal primer failure
AF - adhesive failure
SCF - slight cohesive failure
PF - primer failure One of the most effective stabilizers, hydroquinone (HQ) was tested at various levels using the same sealant formulation and primers as in Examples 1-9. The sealant/glass interfaces were exposed to outside radiation (late summer, northeast U.S.) and to ultraviolet radiation from the carbon arc in an Atlas Weatherometer.

Model XW. Shear adhesion test results were as follows:

| Ex. | HQ, pbw | Outside 14 days | Exposure 30 days | Shear adhesion, psi Weatherometer 500 hrs. | 1000 hrs. | 1500 hrs. |
|---|---|---|---|---|---|---|
| 10 | 0.25 | 181 CF | 198 CF | 222 CF | 205 60% CF | 170 60%CF |
| 11 | 0.5 | 183 CF | 256 CF | 241 CF | 250 90% CF | 229 CF |
| 12 | 1.0 | 195 CF | 200 CF | 244 CF | 290 97% CF | 235 CF |
| 13 | 2.0 | 228 CF | 238 CF | 242 CF | 250 CF | 215 CF |

Hydroquinone was also tested as a stabilizer in the same sealant formulation except that the curing agent was changed as follows:

| Ex. | Curing Agent | Parts by Weight |
|---|---|---|
| 14, 15 | Lead Dioxide ($PbO_2$) | 7.5 |
| 16, 17 | Manganese Dioxide ($MnO_2$) | 4 |
| 18, 19 | Calcium Orthoplumbate ($Ca_2PbO_4$) | 20 |

| Ex. | HQ, pbw | Season | Shear Adhesion psi After Outside Exposure 7 days | 14 days | 30 days |
|---|---|---|---|---|---|
| 14 | none, control | W | 186 MPF | 186 glass broke | 220 CF |
| 15 | 0.5 | W | 245 MPF | 213 glass broke | 312 CF |
| 16 | none, control | W | 27 CF | — | 46 CF |
| 17 | 0.5 | W | 137 CF | — | 158 CF |
| 18 | none, control | W | 184 CF | — | 190 CF |
| 19 | 0.5 | W | 183 CF | — | 230 CF |

The above examples illustrate the effect of hydroquinone in improving the cohesive strength of cured polysulfide sealants.

EXAMPLES 20-27

The room temperature penetrometer cure rate and the qualitative quick adhesion properties of curable liquid polysulfide sealant compositions containing from 0 to 2.0 parts by weight of hydroquinone per 100 parts of LP-32, —SH terminated liquid polysulfide polymer and from 0 to 0.75 parts by weight of myristyl dimethyl benzyl ammonium chloride per 100 parts of the liquid polysulfide polymer is shown by the following examples. In each example the room temperature curable sealant composition was prepared by homogeneously mixing together the listed ingredients at room temperatures about 70° to 75°F, then adding 1.7 percent total composition weight of water to activate the system.

The curing rate and quick adhesion properties are vital in sealants used in automobile windshield sealing applications.

Examples 20-28 illustrate that the addition of the ultraviolet adhesion stabilizer has an adverse effect upon both the curing rate and quick adhesion properties of the liquid polysulfide sealants. However, these examples further illustrate that the addition of small amounts of the curing and adhesion rate regulator, restores and improves the acceptable curing rate and quick adhesion properties of the sealant.

The penetrometer cure rate test indicates the time necessary for the sealant to cure. As the sealant approaches a completely cured state the penetrometer needle will penetrate less into the sealant. Therefore, the smaller the distance, in mm, the needle has penetrated the material as shown in examples 20-28 the more completely the sealant has cured. When the needle fails to penetrate the sealant a complete cure has been obtained.

In the quick adhesion test, beads of the sealant are placed on specially prepared test panels. These beads are peeled from the panels or substrates at predetermined times. When the beads are peeled from the substrates the most desirable situation is for the bead to exhibit a cohesive failure resulting in a portion of the bead remaining on the substrate. The most undesirable situation is for the bead when pulled away from the substrate to exhibit an adhesion failure resulting in no portion of the bead remaining on the substrate. Another situation which is also undesirable is the situation where the bead when peeled from the substrate leaves only a very thin film. This indicates that there has been some cohesion failure in the bead. However, it also indicates some adhesion failure which is certainly undesirable.

The penetrometer cure rate test is conducted by placing a test specimen one-half inch thick onto a 5 inch × 10 inch glass panel. The test specimen is allowed to cure at 77°F. for 1 hour. The penetrometer needle as described in ASTM-D5 is adjusted so that it just touches the surface of the test specimen. Then a 50 gram loaded needle is applied for 5 seconds as described in ASTM-D5 and the penetration of the needle into the specimen is recorded in mm's. This test was conducted in examples 20-28 after the first hour and at ½ hour intervals thereafter for 7 hours and the results recorded.

The quick adhesion test is conducted by preparing one steel 5 inch × 10 inch panel by priming the metal and then top coating it with a white acrylic body lacquer using the flow coat process. The acrylic lacquer was then coated with a chlorinated rubber urethane primer containing approximately 5 to 10 percent solids. Also used in the test is 1 primed glass 5 inch × 10 inch panel. The primer used on the glass was a commercially available aminoalkyl silicone primer. However, a chlorinated rubber urethane primer containing approximately 5 to 10 percent solids was used also as a top coat for the aminoalkyl silicone primer. Nine beads of the test material are applied to the glass and steel panels at 77°F. After application of the sealant beads, all test panels are allowed to cure at 77°F. for 1 hour, then immersed in cold water for 10 minutes and removed. One bead is immediately peeled from both the glass and steel panels. A bead is removed each hour thereafter for 7 hours then a bead is removed after 24 hours. Failure should occur within the bead itself. This type of failure is cohesive failure and is desirable. Adhesion failure is undesirable since the bead would be completely pulling away from the substrate. This test was conducted in examples 20–27 and the results recorded.

The compositions as prepared and cured, and the physical properties as found for the cured test pieces were as follows:

| Example No. | 20 | 21 | 22 | 23 | 24 | 25 | 26 | 27 |
|---|---|---|---|---|---|---|---|---|
| *-SH terminated polysulfide polymer (Thiokol LP-32) | 100 | 100 | 100 | 100 | 100 | 100 | 100 | 100 |
| Hydroquinone (Tennessee Eastman Corp. H-329) | 0 | 0 | 0.25 | 0.25 | 0.5 | 0.5 | 2.0 | 2.0 |
| Myristyl dimethyl benzyl ammonium chloride (ONYX Chemical Company BTC 100) | 0 | 0.5 | 0.25 | 0.75 | 0.5 | 1.0 | 0.25 | 0.75 |
| Chlorinated hydrocarbon plasticizer containing 54% Cl (Monsanto Co. Aroclor 1254) | 40 | 40 | 40 | 40 | 40 | 40 | 40 | 40 |
| Triethylamine | 0.5 | 0.5 | 0.5 | 0.5 | 0.5 | 0.5 | 0.5 | 0.5 |
| Carbon black (Cabot Corp. Sterling MT) pigment | 50 | 50 | 50 | 50 | 50 | 50 | 50 | 50 |
| Carbon black (Cabot Corp. Sterling R) pigment | 20 | 20 | 20 | 20 | 20 | 20 | 20 | 20 |
| Calcium peroxide (FMC Corp. Becco 60%) curing agent | 8 | 8 | 8 | 8 | 8 | 8 | 8 | 8 |
| Calcium oxide | 5 | 5 | 5 | 5 | 5 | 5 | 5 | 5 |
| Toluene | 3.5 | 3.5 | 3.5 | 3.5 | 3.5 | 3.5 | 3.5 | 3.5 |
| Water (activator) | | | | 1.7% of Total Weight | | | | |

* The polysulfide polymer has essentially the structure $HS(C_2H_4\text{-}O\text{-}CH_2\text{-}O\text{-}C_2H_4\text{-}S\text{-}S)_{22}C_2H_4\text{-}O\text{-}CH_2\text{-}O\text{-}C_2H_4\text{-}SH$.

PHYSICAL PROPERTIES (a) Penetrometer Cure Rate, mm

| TIME Example No. | 20 | 21 | 22 | Penetration (mm) 23 | 24 | 25 | 26 | 27 |
|---|---|---|---|---|---|---|---|---|
| 1 hr. | 3.5 | 11.4 | 16 | 16 | 16 | 16 | 16 | 16 |
| 2.5 hrs. | 1.2 | 3.7 | 6.3 | 16 | 16 | 16 | 16 | 16 |
| 3 hrs. | 1.1 | 3.4 | 4.5 | 16 | 15.6 | 16 | 11.3 | 16 |
| 3.5 hrs. | 0.8 | 2.8 | 2.6 | 14.5 | 12.8 | 16 | 7.8 | 16 |
| 4 hrs. | — | 2.1 | 2.0 | 8.9 | 9.7 | 16 | 5.7 | 14.8 |
| 4.5 hrs. | — | — | — | 6.9 | 7.3 | 16 | 4.0 | 12.2 |
| 5 hrs. | — | — | — | 6.0 | 6.1 | 13.1 | 2.9 | 9.5 |
| 5.5 hrs. | — | — | — | 4.5 | 4.6 | 10.8 | 2.5 | 6.4 |
| 6 hrs. | — | — | — | 4.0 | 4.0 | 9.3 | — | 5.9 |
| 6.5 hrs. | — | — | — | 3.3 | 3.6 | 7.3 | — | 5.5 |
| 7 hrs. | — | — | — | 2.6 | 3.4 | 7.3 | — | 4.5 |

(b) Quick Adhesion

| TIME Example No. | 20 | 21 | 22 | Adhesion Properties 23 | 24 | 25 | 26 | 27 |
|---|---|---|---|---|---|---|---|---|
| 1 hr. | MC/VTF/CF | SC/TF/CF | VSC/TF/CF | VSC/TF/CF | VSC/TF/CF | VSC/TF/CF | VSC/TF/CF | VSC/TF/CF |
| 2 hrs. | C/VTF/CF | MC/TF/CF | SC/TF/CF | VSC/TF/CF | VSC/TF/CF | VSC/TF/CF | VSC/TF/CF | VSC/TF/CF |
| 3 hrs. | C/VTF/CF | C/TF/CF | SC/TF/CF | VSC/TF/CF | VSC/TF/CF | VSC/TF/CF | VSC/TF/CF | VSC/TF/CF |
| 4 hrs. | C/VTF/CF | C/TF/CF | MC/TF/CF | VSC/TF/CF | VSC/TF/CF | VSC/TF/CF | VSC/TF/CF | VSC/TF/CF |
| 5 hrs. | C/VTF/CF | C/TF/CF | C/TF/CF | SC/TF/CF | SC/TF/CF | VSC/TF/CF | SC/TF/CF | SC/TF/CF |
| 6 hrs. | C/VTF/CF | C/TF/CF | C/TF/CF | MC/TF/CF | MC/TF/CF | SC/TF/CF | MC/TF/CF | SC/TF/CF |
| 7 hrs. | C/VTF/CF | C/TF/CF | C/TF/CF | MC/TF/CF | MC/TF/CF | SC/TF/CF | MC/TF/CF | SC/TF/CF |
| 24 hrs. | C/VTF/CF | C/TF/CF | C/TF/CF | C/TF/CF | C/TF/CF | C/TF/CF | C/TF/CF | MC/TF/CF |

Code
C -     Complete Cure
MC -    Medium Cure
SC -    Soft Cure
VSC -   Very Soft Cure
TF -    Thick film (remaining after bead is removed)
VTF -   Very thin film (remaining after bead is removed)
CF -    Cohesion failure
AF -    Adhesion Failure

We claim:
1. An ultraviolet radiation adhesion stabilizing and curing and adhesion rate regulating composition for use with curable systems of liquid polysulfide polymers and metal oxide curing agents comprising in admixture:

a. from about 0.1 to 5 parts by weight per 100 parts by weight of liquid polysulfide polymer of ultraviolet radiation adhesion stabilizer selected from the group consisting of quinone and a composition having the formula

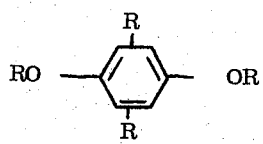

where R is selected from the group consisting of H and an alkyl having from 1 to 6 carbon atoms; and b. from about 0.1 to 1 part by weight per 100 parts by weight of said polymer of curing and adhesion rate regulator quaternary ammonium chloride represented by the formula

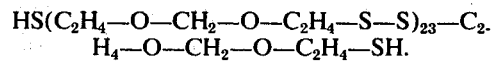

wherein R represents an alkyl containing from 8 to 24 carbon atoms.

2. A composition of claim 1 wherein the ultraviolet radiation adhesion stabilizer is selected from the group consisting of hydroquinone, p-quinone, p-methoxyphenol and p-dimethoxybenzene.

3. A composition of claim 1 wherein the quaternary ammonium chloride is myristyl dimethyl benzyl ammonium chloride.

4. The composition of claim 1 wherein the liquid polysulfide polymer is a —SH terminated liquid polysulfide polymer represented by the formula $HS(C_2H_4-O-CH_2-O-C_2H_4-S-S)_{23}-C_2H_4-O-CH_2-O-C_2H_4-SH$.

5. A composition of claim 1 wherein the curing agent is selected from the group consisting of calcium peroxide, barium peroxide, maganese dioxide, lithium peroxide, lead dioxide and calcium orthoplumbate.

* * * * *